May 29, 1945.  W. G. WOOD  2,376,951
LANDING GEAR STRUT
Filed April 20, 1943  2 Sheets-Sheet 2
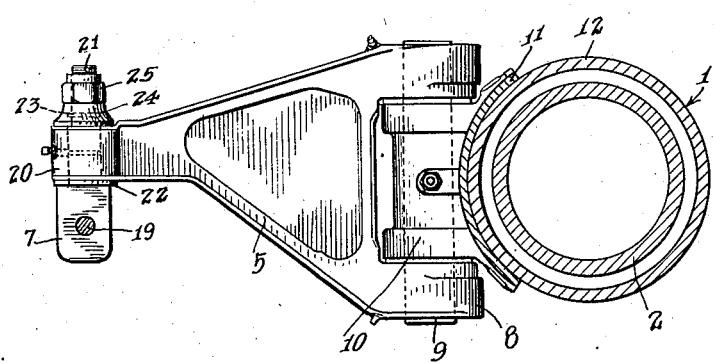
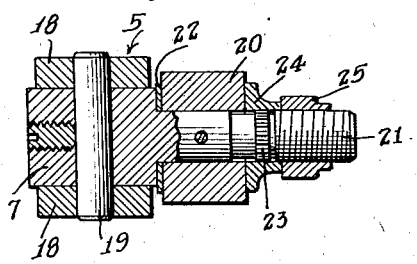
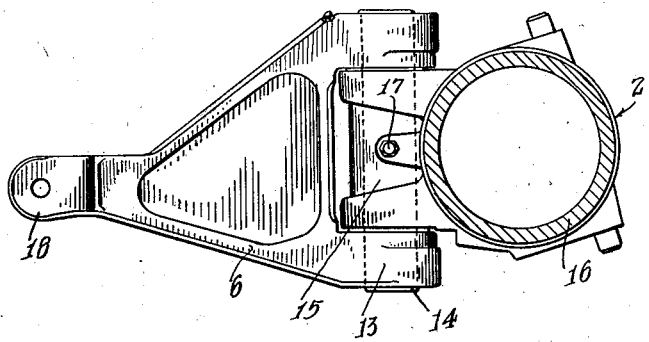
Inventor
Wilbur G. Wood
By Lyon & Lyon
Attorneys

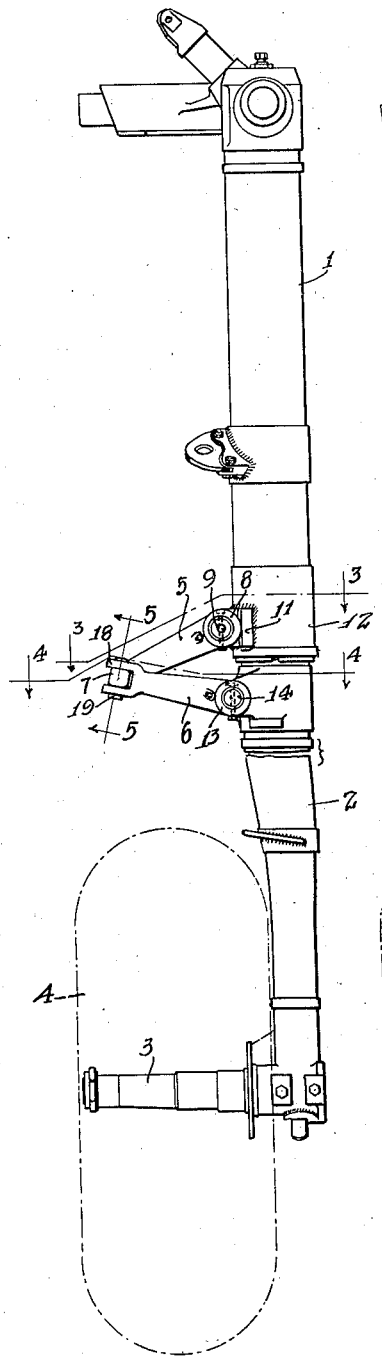
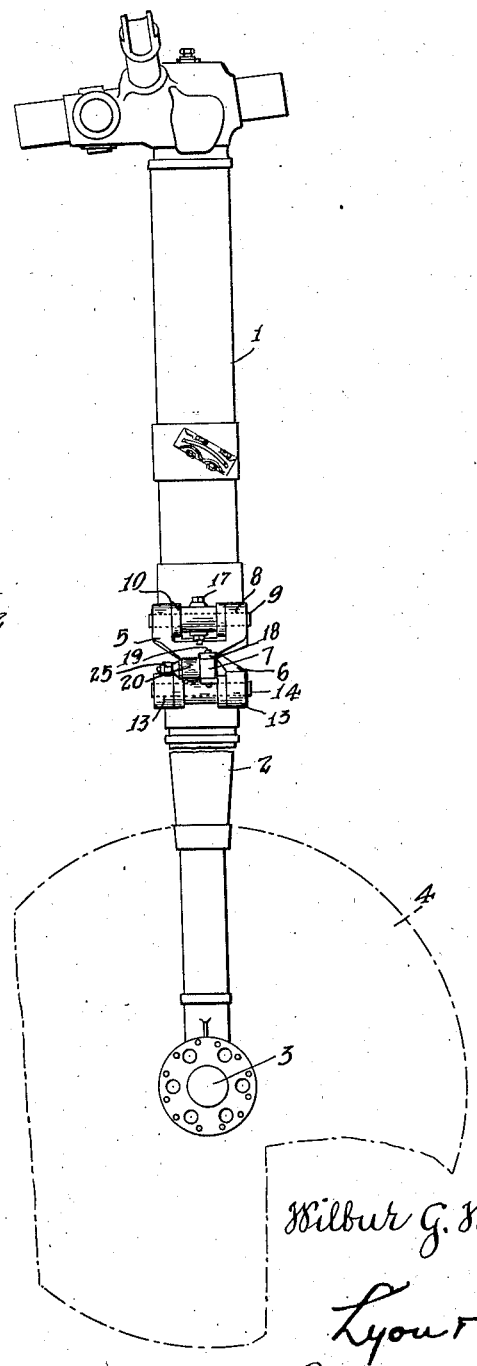

Patented May 29, 1945

2,376,951

UNITED STATES PATENT OFFICE 2,376,951

LANDING GEAR STRUT

Wilbur G. Wood, Glendale, Calif., assignor to Menasco Manufacturing Company, Burbank, Calif., a corporation of California Application April 20, 1943, Serial No. 483,751

9 Claims. (Cl. 244—104)

This invention relates to landing gear struts of the type utilized in the construction of aircraft, and is more particularly directed to the construction of such a landing gear of the hydraulic shock-absorbing type and in which means are provided for controlling and adjusting the position of alignment of the landing wheels supported thereby.

It is a particular object of this invention to provide an aircraft landing gear structure wherein means are provided between the extensible struts thereof for determining the position of alignment of the landing wheel carried by one of such struts.

It is another object of this invention to provide an alignment determining device which is connected between the elements of the hydraulic shock absorbing to maintain a landing wheel in alignment and which provides a simple means of adjustment of such wheel alignment.

Other objects and advantages of this invention it is believed will be apparent from the following detailed description of a preferred embodiment thereof as illustrated in the accompanying drawings.

In the drawings:

Figure 1 is an elevation of a landing gear strut embodying my invention.

Figure 2 is a side elevation thereof.

Figure 3 is a plan view taken substantially on the line 3—3 of Figure 1.

Figure 4 is a plan view taken substantially on the line 4—4 of Figure 1.

Figure 5 is a sectional view taken substantially on the line 5—5 of Figure 1.

In the preferred embodiment of my invention as illustrated in the accompanying drawings, 1 indicates an upper strut member and 2 a lower strut member of an aircraft landing gear. Strut members 1 and 2 are telescoped together and, as is common in such structure, are provided with a hydraulic shock absorbing means resisting their free sliding movement.

Any suitable form of means are provided for securing the upper strut 1 to the aircraft. The lower strut member 2 has at its lower end a spindle 3 upon which a landing wheel 4 is journaled.

As the telescoping struts 1 and 2 are free to move axially relative to each other, means are provided for preventing their relative rotation during such telescoping action, which means are herein illustrated as comprising torque arms 5 and 6 which are pivotally connected together by means of a pivot block 7. The torque arm 5 has a connecting yoke 8 by means of which it is pivotally secured at a pivot pin 9 to a boss 10 which is carried by a plate 11 welded to the collar 12 mounted at the lower end of the strut 1. The torque arm 6 has a similar yoke 13 by means of which it is secured through the medium of a pivot pin 14 to a cylindrical boss 15 carried by the collar 16 of the lower strut 2.

The pin 14 passes through a bore formed through the boss 15 and is secured therein through the medium of a fastening bolt 17.

The torque arm 6 has formed at its outer end a fork 18 within which the block 7 is mounted. The block 7 carries a pivot pin 19 upon which the fork 18 is journaled. Formed at the outer end of the torque arm 5 is a boss 20, through which a pivot pin 21 formed integral with the pivot block 7 passes.

An adjustment shim 22 is positioned upon the pivot pin 21 to engage the end face of the block 7 and the adjacent face of the boss 20. The pivot pin 21 has formed thereon a knurled flange 23 over which there is fitted an internally knurled washer 24. The washer 24 engages the outer face of the boss 20.

A securing nut 25 is threaded to the end of the pivot pin 21 to maintain the assembly. The pivotally connected torque arms 5 and 6 thereby resist relative rotation of the struts 1 and 2 while the pivotal connection provided with the pivot block 7 permits relative axial movement of the said struts.

By adjustment of the thickness of the shim 22, the position of alignment of the wheel 4 may be easily determined. By utilizing a thicker shim 22 as the landing gear assembly is illustrated in Figure 1, the wheel 4 will be rotated toward the right. Similarly, by reducing the thickness of the shim 22, the reverse revolution of the wheel 4 will be accomplished. The locking means provided by the assembly of the internally knurled washer 24 and the knurled flange 23 of the pin 21 prevents relative rotation of the pin 21, washer 24 and securing nut 25, thereby insuring against relative rotation between the pin 21 and the nut 25 which would otherwise act to release the clamping action of the nut 25 tending to hold the shim 22 against the faces of the cylindrical boss 20.

Having fully described my invention, it is to be understood that the same is of the full scope of the appended claims.

I claim:

1. In a landing gear, the combination with a pair of telescoping strut members, one of which carries a landing wheel, the said struts being telescoped together for relative longitudinal movement, of a torque resisting means connected between said struts for maintaining a position of alignment of the landing wheel, said torque resisting means comprising: torque arms, one of which is pivotally connected by its one end with each of said struts, and alignment adjustment pivotal connecting means for pivotally connecting the other ends of said torque arms.

2. In a landing gear construction having a pair of telescoping struts, one of which carries a landing wheel, means for resisting relative rotation of said struts, said means including: a pair of radially extending torque arms, each pivotally connected at its radially inner end with a strut; and an alignment adjusting means pivotally connecting the radially outer ends of said torque arms, said alignment adjustment means including a stud which is adapted to be pivotally connected to the radially outer end of one of said torque arms and is adapted to be pivotally and adjustably connected with a radially outer end of the other of said torque arms, there being a shim positioned upon said stud between the radially outer end of one of said torque arms and the means for pivotal connection with the end of the other of said torque arms.

3. In a landing gear construction, the combination with a pair of relatively longitudinally moving strut members, one of which carries a landing wheel in a position of alignment, of a torque resisting means interconnected between said struts for holding the same from relative rotation, said torque resisting means comprising: a pair of radially extending torque arms, each of which is pivotally secured to a strut at its radially inner ends; an alignment adjustment pin block pivotally connecting the radially outer ends of said torque arms, and having an adjustment shim interposed between one of said torque arms and said block whereby the position of the alignment of the wheel carried by the strut member is determined.

4. In a landing gear construction having a pair of relatively longitudinally moving strut members, one of which carries a landing wheel oriented relative to the other strut member, the combination of a torque resisting means being interconnected between said struts for holding the same from relative rotation, said torque resisting means comprising: a pair of radially extending torque arms, each of which is pivotally secured at its radially inner end to a strut; a fork formed at the radially outer end of one of said torque arms; a boss formed at the radially outer end of the other torque arm; a pivot block pivotally mounted in said fork and a pivot stem extending from said block and journaled in said boss; an adjustment shim interposed between the boss and the block whereby the orientation of the wheel carried by said one strut member is varied, a nut threaded to said pin, a lock washer having an internal knurled surface and said pin having a coacting externally knurled surface to secure the pin in position within the said boss.

5. An aircraft landing gear, comprising: a pair of telescoping struts; a pair of radially disposed torque arms, hinged at their radially inner ends to said struts for movement about substantially parallel axes traversing the longitudinal axis of said struts, the radially outer ends of said arms being in circumferential abutment; means for connecting and relatively journalling the radially outer ends of said torque arms about an axis substantially parallel with their hinged axes; and means adapted to be interposed between the circumferentially abutting radially outer extremities of said torque arms to displace said arms circumferentially thereby to vary the relative orientation of said telescoping struts.

6. An aircraft landing gear, comprising: a pair of telescoping struts; a pair of radially disposed torque arms, hinged at their radially inner ends to said struts for movement about substantially parallel axes traversing the longitudinal axis of said struts, the radially outer ends of said arms being in circumferential abutment, a connecting means joining the radially outer extremities of said torque arms; said connecting means including pivotal elements for each of said torque arms disposed in perpendicularly related axes, the axis of one of said pivotal elements being substantially parallel with the hinged axes between said torque arms and said struts.

7. An aircraft landing gear, comprising: a pair of telescoping struts; a pair of radially disposed torque arms, hinged at their radially inner ends to said struts for movement about substantially parallel axes traversing the longitudinal axis of said struts, the radially outer ends of said arms being in circumferential abutment; means for connecting and relatively journalling the radially outer ends of said torque arms about an axis substantially parallel with their hinged axes; a connecting means joining the radially outer extremities of said torque arms; said connecting means including a first journal element connected with one of said torque arms and disposed in an axis substantially parallel with the axes between said torque arms and said struts, and a second journal element connected with the other of said torque arms and disposed perpendicularly to a plane defined by the axis of said first journal element and the axis of the connection between said other torque arm and its strut.

8. An aircraft landing gear, comprising: a pair of telescoping struts; a pair of radially disposed torque arms, hinged at their radially inner ends to said struts for movement about substantially parallel axes traversing the longitudinal axis of said struts, the radially outer ends of said arms being in circumferential abutment, means for connecting and relatively journalling the radially outer ends of said torque arms about an axis substantially parallel with their hinged axes; a connecting means joining the radially outer extremities of said torque arms; said connecting means including pivotal elements for each of said torque arms disposed in perpendicularly related axes, the axis of one of said pivotal elements being substantially parallel with the hinged axes between said torque arms and said struts, and means disposed on said one journal axis for varying the circumferential spacing of said torque arms.

9. An aircraft landing gear, comprising: a pair of telescoping struts; a pair of radially disposed torque arms, hinged at their radially inner ends to said struts for movement about substantially parallel axes traversing the longitudinal axis of said struts, the radially outer ends of said arms being in circumferential abutment; means for connecting and relatively journalling the radially outer ends of said torque arms about an axis substantially parallel with their hinged axes; a connecting means joining the radially outer extremities of said torque arms; said connecting means including a first journal element connected with one of said torque arms and disposed in an axis substantially parallel with the axes between said torque arms and said struts, and a second journal element connected with the other of said torque arms and disposed perpendicular to a plane defined by the axis of said first journal element and the axis of the connection between said other torque arm and its strut, and means incorporated with said first journal element for varying the circumferential spacing of said torque arms, thereby to vary the circumferential orientation of said struts.

WILBUR G. WOOD.